United States Patent Office 3,253,608
Patented May 31, 1966

3,253,608
CONTROL OF LIQUID DISTRIBUTION
Albert Henry Davis, 772 Buckingham Ave.,
Slough, Buckingham, England
Filed Apr. 26, 1962, Ser. No. 190,484
Claims priority, application Great Britain, Apr. 27, 1961,
15,286/61
3 Claims. (Cl. 137—220)

In a system of liquid distribution, such as one supplying fuel to distant points on an aerodrome, it is of importance to keep the pressure in the system nearly constant notwithstanding frequent and sudden variations in the rate at which liquid is delivered from the system; various automatically controlled valves have been devised for this purpose, mostly of the tappet type, which involve considerable difficulties in production.

The present invention is a pressure controller which can lie in line with the liquid supply pipe it controls, and indeed be co-axial with it. Its valve is a sleeve valve controlled by a diaphragm clamped to it and to the valve housing and subjected on the one side to the pressure of the liquid on the downstream side of the valve and on the other side to air pressure from an air reservoir in which the air is maintained at a constant though adjustable pressure. The diaphragm is preferably of synthetic rubber reinforced with nylon; to provide the requisite flexibility while keeping the diameter of the controller small the diaphragm may be deeply corrugated. Since reversal of the pressure on the diaphragm, so as to bring the excess pressure on its convex side would tend to reverse the corrugation it is preferred to use two diaphragms, one subject always to air pressure on its concave side, the other to liquid pressure on its concave side.

In order that the invention may be thoroughly understood two pressure controllers in accordance with it will be described in some detail, by way of example, with reference to the accompanying drawings, in which.

Figure 1:
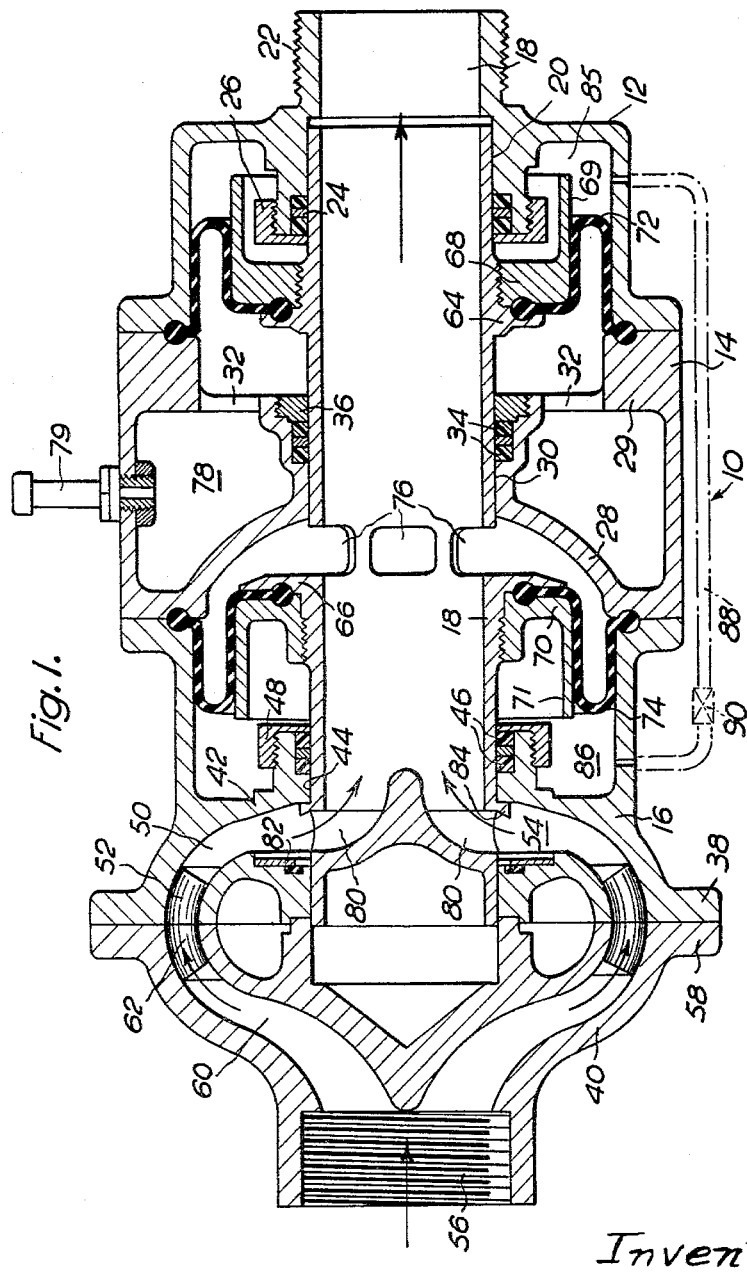
FIGURE 1 is a longitudinal section of one controller.

The housing of the controller valve shown in FIGURE 1 is a barrel 10 of somewhat larger diameter than the liquid supply pipe in which it is to be used. The barrel 10 is divided transversely into three co-axial parts 12, 14, 16, each of which has integral with it a portion of a cylindrical seating for a sleeve valve 18, the seating being of such diameter and the sleeve of such thickness that the bore of the sleeve is substantially the same as the bore of the supply pipe (not shown) into which the valve is to be connected. The outlet end section 12 of the barrel is partly closed, its end wall extending inward as part 20 of the valve seating, and outward as a threaded tubular 22 adapted for connection into the supply pipe line; in its seating portion 20 are gland seals 24 to make a joint with the sleeve valve 18 and these are compressed by a cap 26 screwing upon the end of the seating portion 20. The mid section 14 of the barrel 10 includes transverse parts 28, 29 joining the seating portion 30 at both ends to the barrel wall; the transverse part 29 next the outlet end has openings 32 in it; there are glands 34 in the seating portion 30 and a threaded ring compresses them. The inlet section 16 of the barrel is flanged at 38 for junction to a similarly flanged inlet casting 40, and has an end wall 42 carrying its portion 44 of the valve seating with glands 46 and a gland cap 48. In the thickness of the end wall 42 there is a curved annular passage 50 leading from a ring of ports 52 on the flat flanged surface to an annular port 54 in the valve seating 44. The inlet casting 40 is adapted at its outer end 56 for connection with the supply pipe and at its flanged inner end 58 abuts on the flange 38 of the barrel 10; in its thickness is an annular passage 60 extending from its pipe connection 56 to a ring of ports 62 on the flat surface of the flange 58 registering with the ports 52 on the surface of the barrel flange 38.

The sleeve valve 18 is, in the main, a simple cylinder, but it has two outwardly extending flanges, 64 and 66, one on each side of the middle section of its seating approximately opposite the end of the middle section 14 of the barrel 10. Clamping rings 68 and 70 with outward cylindrical extensions 69 and 71 screw upon the valve sleeve 18 so as to abut upon its flanges 64 and 66 respectively.

An annular diaphragm 72 of reinforced rubber-like material is clamped at its outer margin between the outlet portion 12 and middle portion 14 of the barrel, and is clamped at its inner margin between the adjacent flange 64 of the valve sleeve 18 and the clamping ring 68 abutting on it. Another similar diaphragm 74 is similarly clamped between the middle and inlet sections 14 and 16 of the barrel 10 and between the other flange 66 of the valve sleeve 18 and its clamping ring 70. The diaphragms 72 and 74 may be beaded at their margins, the clamping surfaces being grooved to accommodate the beads. These diaphragms have each one deep annular corrugation confined between the inner surface of the barrel 10 on the one hand and the cylindrical extensions 69 and 71 of the clamping rings 68 and 70 on the other hand. The corrugations extend in opposite directions, that at the outlet end extending in the downstream direction. A ring of ports 76 in the valve sleeve 18 near the inlet end of the middle section 14 of the barrel 10 allows the liquid pressure to bear upon the concave side of the diaphragm 74 clamped between the middle and inlet sections 14 and 16. The space 78 within the middle section 14 of the barrel 10 bounded in part by the wall of the section and in part by the valve sleeve 18 and the adjacent diapragm 72, is supplied with air under pressure. It is fitted with a valve 79 of the Schrader type, and the pressure in it raised to the desired value in the same way as a motor vehicle tire is inflated.

When the valve 18 is fully opened an annular port 80 at the inlet end of the valve sleeve registers with the annular inlet port 54 in its seat. Liquid from the inlet section 16 flows in an annular stream into the valve sleeve 18 and thereafter has a wholly straight path to the downstream part of the supply pipe. The pressure of the liquid upon the diaphragm 74 exposed to it tends to close the valve 18, but closing will not occur until the pressure of the liquid on the downstream side exceeds the air pressure in the space 78. If the diaphragms 72 and 74 are of the same area the pressure per square inch of the liquid will be prevented from exceeding the pressure per square inch of the air.

When no liquid is drawn from the system, minute leakage past the valve 18 can in time build up the pressure on the downstream side to the supply pressure. To prevent this a preferably flexible annular valve seating 82 is inset in the upstream side of the curved annular passage 54 in the inlet section 16 of the barrel 10, and the downstream edge of the registering annular port in the valve sleeve is formed with an annular rib 84 in a position to abut upon this seating 82.

There are air spaces 85 and 86 between the barrel 10 and the valve sleeve 18 on the outer sides of the diaphragms 72 and 74; they may be joined by a pipe as shown in broken lines 88 or a passage in the barrel casting to keep them at the same pressure; and if a cock 90 is provided in the pipe 88 or passage, failure of either diaphragm can promptly be discovered.

Figure 2:
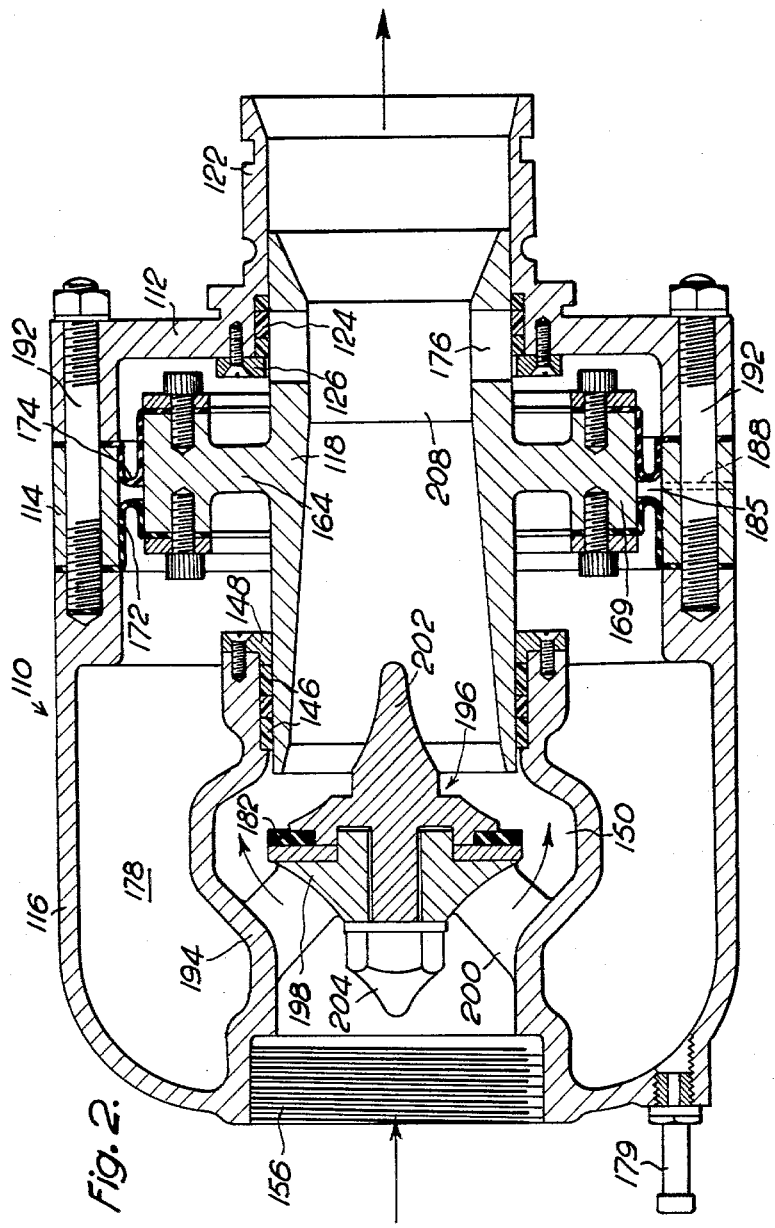
FIGURE 2 is a similar section of the other controller.

The valve shown in FIGURE 2 similarly comprises a barrel 110 divided transversely into three co-axial parts 112, 114 and 116. There is a sleeve valve 118 within the barrel 110 for which the barrel provides a cylindrical seating and gland seats 124 and 146 compressed by caps 126 and 148 respectively.

Again there are two annular diaphragms 172 and 174 clamped at their outer margins between the middle and the end portions of the barrel 110 and at their margins to a flange 164 on the valve sleeve 118, and the diaphragms 172 and 174 each have one deep annular corrugation confined between the inner surface of the barrel 110 on the one hand and a cylindrical surface carried on the valve sleeve 118.

It is in the arrangement of the valve sleeve 118 and the two diaphragms 172 and 174 and in the simplification of the castings 112, 114 and 116 of the barrel 110 that the valve shown in FIGURE 2 differs substantially from that in FIGURE 1.

Thus, while the diaphragm 172, like its counterpart 72 is subjected to air pressure on its concave side and the diaphragm 174 to liquid pressure on its concave side, unlike their counterparts 72 and 74, the diaphragms are arranged with their convex sides toward one another and both can thus be secured to a cylindrical extension 169 of the single flange 164 of the valve sleeve 118 with a single air space 185 between them. The middle portion 114 has no transverse parts and carries no portion of the valve seating, so that it can be, as shown, a simple cylindrical spacer, bored to receive the bolts 192 by which the three portions 112, 114 and 116 are secured to form the barrel 110.

Liquid under a pressure prevailing on the downstream side of the valve is allowed to bear upon the concave side of the diaphragm 174 around the outlet end of the valve sleeve 118.

The outlet portion 112 of the barrel 110 has an end wall extending outward as a tubulure 122 adapted to swivel in a ballrace. Obviously a variety of connections are permissible without affecting the operation of the valve.

Air is maintained under pressure on the concave side of the diaphragm 172 in the chamber 178 bounded by the domed outer wall of the inlet portion 116 of the barrel 110, by an inward extension 194 of that section, by part of the valve sleeve 118 and by the diaphragm 172. Air is admitted to the chamber by way of a valve 179 of the Schrader type.

To prevent leakage past the closed sleeve valve 118 a flexible annular valve seating 182 is mounted on a central streamlined core or boss 196 to register with the open end of the sleeve 118. The core comprises an upstream part 198 secured to the extension 194 of the barrel section 116 by radial webs 200 and a downstream part 202. The two parts 198 and 202 are secured to one another by a nut 204 and the valve seating 182 is clamped between them. The nut 204 and the part 198 taper towards the inlet, and the part 202 tapers toward the outlet.

The extension 194 forms the outer wall of an inlet passage threaded at 156 to form a pipe connection. In the region of the core 196 the bore of the extension is suitably enlarged to provide a curved annular passageway 150 from the inlet to the bore of the valve sleeve 118.

The normal operation of this valve is in principle the same as that described above with reference to FIGURE 1. Failure of either diaphragm can promptly be discovered if, as shown, a vent hole 188 is incorporated in the middle portion 114 of the barrel 110. If the diaphragm 172 fails it will then be impossible to pressurize the chamber 178, while failure of the diaphragm 174 will be indicated by a stream of liquid issuing from the vent 188.

It will be observed that the bore of the valve sleeve 118 has the configuration of a venturi. This is to enable the valve to control the pressure at a remote downstream point in the supply line rather than immediately downstream of the valve. The ports 176 admitting liquid to the concave side of the diaphragm 174 are arranged in the region of the venturi throat 208, the sizing of which is determined in accordance with the liquid resistance between the valve and the remote downstream point at which it is required that the pressure be controlled. A cylindrical bore would be used if the required pressure is that at the immediate outlet of the valve. The same venturi principle could be applied, if need be, to the valve shown in FIGURE 1.

I claim:

1. A pressure controller in the form of a sleeve valve, for controlling the pressure in a liquid supply pipe downstream of the valve, said valve comprising a housing having an inlet and an outlet adapted for connection into said supply pipe, a valve sleeve actually movable within said housing having an open position providing a passage for liquid from said inlet to said outlet, a seating for said valve within said housing, two spaced deeply corrugated diaphragms each having one deep annular corrugation confined between an inner surface of said housing on the one hand and cylindrical surfaces on said valve sleeve on the other hand, said corrugations extending in opposite directions, and each said diaphragm being clamped to said housing and to said sleeve, an air reservoir within said housing on the concave side of one of said diaphragms, means for maintaining a constant though adjustable air pressure within said reservoir, and means for subjecting the concave side of the other of said diaphragms to the pressure of liquid on the downstream side of said valve, said valve sleeve being so disposed within said housing in relation to said inlet and said outlet that the valve can lie in line with said liquid supply pipe, and said valve sleeve being axially movable within said housing from said open position to a closed position under the joint control of said two diaphragms in response to liquid pressure in excess of a value determined by the air pressure in said reservoir, said one diaphragm subjected to air pressure being nearer to said outlet and has its corrugation extending in the downstream direction.

2. A pressure controller in the form of a sleeve valve, for controlling the pressure in a liquid supply pipe downstream of the valve, said valve comprising a housing having an inlet and an outlet adapted for connection into said supply pipe, a valve sleeve actually movable within said housing having an open position providing a passage for liquid from said inlet to said outlet, a seating for said valve within said housing, two spaced deeply corrugated diaphragms each having one deep annular corrugation confined between an inner surface of said housing on the one hand and cylindrical surfaces on said valve sleeve on the other hand, said corrugations extending in opposite directions, and each said diaphragm being clamped to said housing and to said sleeve, an air reservoir within said housing on the concave side of one of said diaphragms, means for maintaining a constant though adjustable air pressure within said reservoir, and means for subjecting the concave side of the other of said diaphragms to the pressure of liquid on the downstream side of said valve, said valve sleeve being so disposed within said housing in relation to said inlet and said outlet that the valve can lie in line with said liquid supply pipe, and said valve sleeve being axially movable within said housing from said open position to a closed position under the joint control of said two diaphragms in response to liquid pressure in excess of a value determined by the air pressure in said reservoir, air spaces disposed between said housing and said valve sleeve on the other side of said diaphragms, said spaces being interconnected by passage means, whereby to keep them at the same pressure, and a cock in said passage means whereby failure of either of said diaphragms can be promptly discovered.

3. A pressure controller in the form of a sleeve valve, for controlling the pressure in a liquid supply pipe downstream of the valve, said valve comprising a housing having an inlet and an outlet adapted for connection into said supply pipe, a valve sleeve actually movable within said housing having an open position providing a passage for liquid from said inlet to said outlet, a seating for said valve within said housing, two spaced deeply corrugated diaphragms each having one deep annular corrugation confined between an inner surface of said housing on the one hand and cylindrical surfaces on said valve sleeve on the other hand, said corrugations extending in opposite directions, and each said diaphragm being clamped to said housing and to said sleeve, an air reservoir within said housing on the concave side of one of said diaphragms, means for maintaining a constant though adjustable air pressure within said reservoir, and means for subjecting the concave side of the other of said diaphragms to the pressure of liquid on the downstream side of said valve, said valve sleeve being so disposed within said housing in relation to said inlet and said outlet that the valve can lie in line with said liquid supply pipe, and said valve sleeve being axially movable within said housing from said open position to a closed position under the joint control of said two diaphragms in response to liquid pressure in excess of a value determined by the air pressure in said reservoir, in which the bore of the valve sleeve having the configuration of a venturi and liquid pressure is allowed to bear upon the diaphragm by a port or ports in the valve sleeve at the venturi throat, the sizing of which throat is determined in accordance with the liquid resistance between the valve and a remote downstream point in the liquid supply line at which pressure is to be controlled.

References Cited by the Examiner

UNITED STATES PATENTS

| | | | |
|---|---|---|---|
| 869,830 | 10/1907 | Dalen | 137—484.2 |
| 2,460,168 | 1/1949 | Caserta | 137—793 X |
| 2,707,966 | 5/1955 | Taplin | 137—116.5 |
| 2,888,949 | 6/1959 | Evans | 137—505.25 |
| 2,996,074 | 8/1961 | Page | 137—220 |

FOREIGN PATENTS 5,064    2/1912   Great Britain.

M. CARY NELSON, *Primary Examiner.*

ISADOR WEIL, *Examiner.*

A. JAFFE, E. FEIN, *Assistant Examiners.*